（12) United States Patent
Schwarz et al.

(10) Patent No.: US 8,779,707 B2
(45) Date of Patent: Jul. 15, 2014

(54) INVERTER SYSTEM FOR OPERATING AN ELECTRIC MOTOR

(75) Inventors: Albrecht Schwarz, Rutesheim (DE);
Martin Trunk, Moeglingen (DE);
Daniel Raichle, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 13/513,765

(22) PCT Filed: Oct. 15, 2010

(86) PCT No.: PCT/EP2010/065528
§ 371 (c)(1), (2), (4) Date: Aug. 22, 2012

(87) PCT Pub. No.: WO2011/069725
PCT Pub. Date: Jun. 16, 2011

(65) Prior Publication Data
US 2012/0306417 A1 Dec. 6, 2012

(30) Foreign Application Priority Data
Dec. 8, 2009 (DE) .......................... 10 2009 047 616

(51) Int. Cl.
*H02P 3/00* (2006.01)
(52) U.S. Cl.
USPC ...................................... 318/400.26; 318/376
(58) Field of Classification Search
USPC ............... 318/400.26, 375, 376, 379
See application file for complete search history.

(56) References Cited

U.S. PATENT DOCUMENTS

| 5,291,106 A | 3/1994 | Murty et al. |
| 5,631,813 A * | 5/1997 | Ikeshita .......................... 363/37 |
| 6,060,851 A * | 5/2000 | Imai et al. ..................... 318/437 |
| 6,268,707 B1 * | 7/2001 | Decottignies ................... 318/65 |
| 7,675,254 B2 * | 3/2010 | Rottmerhusen ............ 318/254.1 |

FOREIGN PATENT DOCUMENTS

DE 10 2006 003 254 7/2007
DE 10 2007 053 673 5/2009

OTHER PUBLICATIONS

International Search Report for PCT/EP2010/065528, dated Apr. 1, 2011.

* cited by examiner

*Primary Examiner* — Bentsu Ro
(74) *Attorney, Agent, or Firm* — Kenyon & Kenyon LLP

(57) ABSTRACT

An inverter system for operating an electric motor includes an input port for providing an electrical voltage, a bridge inverter circuit connected downstream from the input port for generating an electrical alternating voltage for the electric motor based on the electrical voltage. The bridge inverter circuit has at least one half-bridge branch including switching elements configured to be open for transferring the electric motor into a freewheeling state, and a decoupling switching element designed for decoupling the at least one half-bridge branch in the freewheeling state of the electric motor from the input port, in order to suppress a reaction of the freewheeling electric motor on the input port.

10 Claims, 3 Drawing Sheets

INVERTER SYSTEM FOR OPERATING AN ELECTRIC MOTOR

BACKGROUND OF THE INVENTION

1. Field of the Invention

The present invention relates to the field of inversion for supplying alternating voltage to electric motors, in particular electric motors in electric vehicle drives.

2. Description of the Related Art

Electric vehicle drives ordinarily include synchronous machines excited by a permanent magnet, to which alternating voltage is supplied using an inverter. FIG. 1 shows an inverter system for operating an electric motor 101 using an inverter circuit, also referred to as an intermediate circuit, which is designed as a B6 bridge. The inverter circuit includes upper half-bridge branches having high-voltage-side switching elements 103, 105 and 107 and lower half-bridge branches having low-voltage-side switching elements 109, 111 and 113. In each case, a diode 115 is situated in series with each switching element 105 through 113. If transistor switches are used to implement the switching elements, diodes 115 and switching elements 103 through 113 are ordinarily implemented jointly by one transistor switch. Freewheeling diodes 117 are situated in each case in parallel with the particular series connection made up of one diode 115 and one switching element 103 through 113 each. Furthermore, an intermediate circuit capacitor 119 is connected in parallel with the inverter circuit, intermediate circuit capacitor 119 being connected during operation in parallel with a constant voltage source which is connected to an input port 121, 123 of the inverter system. As a pulse-controlled inverter, the inverter system represented in FIG. 1 generates a three-phase alternating voltage for activating electric motor 101 with the aid of the B6 bridge inverter circuit.

If an error is detected in the system represented in FIG. 1, electric motor 101 is switched into an active short-circuit by closing three lower switches 109 through 113 or three upper switches 103 through 107. In this case, electric motor 101 behaves electrically neutral, i.e., electric motor 101 neither draws electrical power from the intermediate circuit nor does it emit electrical power to the intermediate circuit. Mechanically, electric motor 101 generates a short-circuit torque on the shaft, corresponding to the power loss in the ohmic resistances of the windings.

However, different situations are conceivable in which switching of electric motor 101 into the active short-circuit is not possible, is technically complex, is not practical or is not even allowed. Such a case occurs, for example, when the short-circuit torque is large. Furthermore, a hardware effect may occur, with the result that it may no longer be possible to switch into the active short-circuit or do so only with great technical complexity, for example, if the circuit breakers have been blown or are no longer closeable, which does not allow an active short-circuit. Furthermore, it may be the case that the circuit breakers are no longer openable, or that the voltage supply of the pulse-controlled inverter is defective, so that the power section of the pulse-controlled inverter must be supplied from a high-voltage source. Furthermore, it may be the case that electric motor 101 is not sustained short-circuit-proof.

One alternative to the active short-circuit in the error case is also for electric motor 101 to freewheel, in which case all the circuit breakers are opened. In the case of freewheeling, the electric motor generates a speed-dependent voltage by induction. If the induced voltage is, for example, higher than the voltage applied to the intermediate circuit, it is fed back into the intermediate circuit via freewheeling diode 117. A negative torque corresponding to the recovered energy then acts upon the shaft of the electric motor. Moreover, the high-voltage battery connected to the pulse-controlled inverter on the input side may be overcharged and damaged due to the energy recovery.

BRIEF SUMMARY OF THE INVENTION

The present invention is based on the finding that an electric motor may be transferred into active freewheeling without recovery of energy into the intermediate circuit if the half-bridges, in particular, however their freewheeling diodes, are completely decoupled from an input port. The result of this is that the electric motor is not under an electrical load when freewheeling. Furthermore, it is possible in this way to suppress a reverse flow of current.

According to one aspect, the present invention relates to an inverter system for operating an electric motor, including an input port having, for example, one or multiple terminals for providing an electrical voltage, a bridge inverter circuit connected downstream from the input port for generating an electrical alternating voltage for the electric motor based on the electrical voltage, the bridge inverter circuit having at least one half-bridge branch, for example, an upper or a lower half-bridge branch including switching elements and being designed to open the switching elements for transferring the electric motor into a freewheeling state, and a decoupling switching element, which is designed for decoupling the at least one half-bridge branch in the freewheeling state of the electric motor from the input port, in order to suppress a reaction of the freewheeling electric motor on the input port.

The electrical voltage may be provided on the input side, for example, with the aid of an energy storage, for example, a high voltage. The switching elements may be designed, for example, as circuit breakers. The bridge inverter circuit may further be implemented as a B6 inverter circuit or implemented as a pulse-controlled inverter circuit. For transferring the electric motor into the freewheeling state, it is preferred that all switching elements of the half-bridge branches, i.e., the upper and/or the lower half-bridge branches, are opened.

According to one specific embodiment, the decoupling switching element is connected in series to a freewheeling diode of the half-bridge branch, which advantageously prevents current from flowing through the half-bridge branch when it is switched off.

According to one specific embodiment, the bridge inverter circuit has a number of high-voltage-side switches, and the same number of low-voltage-side switches, one decoupling switching element each being connected in parallel with the high-voltage-side switches and/or in parallel with the low-voltage-side switches. The high-voltage-side switches may implement, for example, upper half-bridges, while the low-voltage-side switches may implement lower half-bridges. When in operation, a positive potential is applied to the high-voltage-side switches, while a ground connection or a lower potential is applied to the low-voltage-side switches. According to one specific embodiment, the decoupling switching element is situated between the input port and the bridge inverter circuit, thus suppressing a reverse flow of current to the input port when the electric motor freewheels.

According to one specific embodiment, the decoupling switching element includes a power transistor which implements a series connection made up of a diode, which may be a freewheeling diode, and a switching element. In this way, the freewheeling diode may be implemented together with the switching element in a particularly simple manner.

According to one specific embodiment, the decoupling switching element is active only in case of error, so that no decoupling is caused by the decoupling switching element during error-free operation of the electric motor.

According to one specific embodiment, the decoupling switching element includes a switch arm having a switch, in particular a transistor switch, a diode being connected in parallel to it. The diode connected in parallel may be, for example, designed as a freewheeling diode, which is in particular advantageous if the input port is decoupled from the bridge inverter circuit. The diode may also be advantageously implemented as a power transistor.

According to another aspect, the present invention relates to an electric drive device having an electric motor and the inverter system according to the present invention for operating the electric motor.

The present invention further relates to a method for operating an electric motor using the inverter system according to the present invention, switching elements of at least one half-bridge branch being opened for transferring the electric motor into a freewheeling state, and the at least one half-bridge branch being decoupled from the input port in the freewheeling state of the electric motor to suppress a reaction of the freewheeling electric motor on the input port.

DETAILED DESCRIPTION OF THE INVENTION

Figure 2:
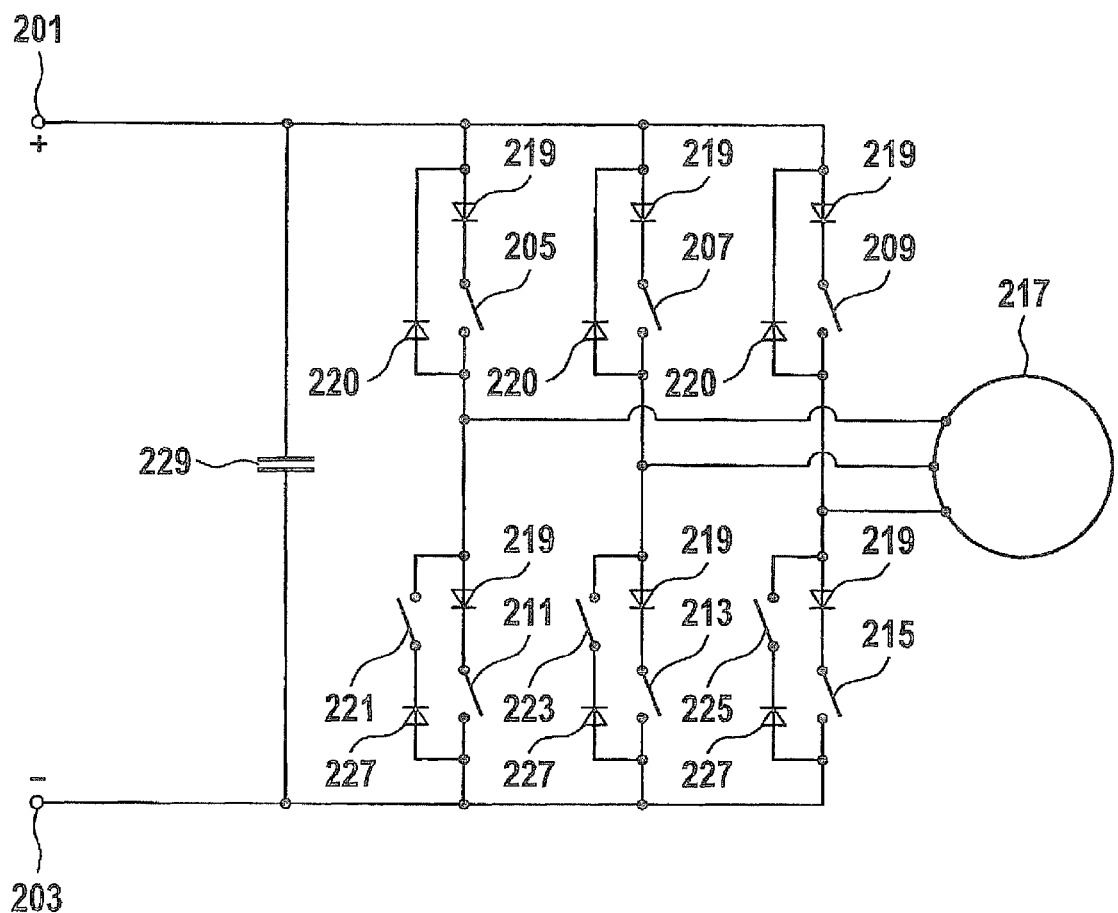
FIG. 2 shows an inverter system according to the present invention.

The inverter system represented in FIG. 2 includes an input port having terminals 201 and 203. Situated downstream from the input port is a bridge inverter circuit as an intermediate circuit which is, for example, a B6 inverter circuit and has upper half-bridge branches including switching elements 205, 207 and 209 on the high-voltage side. One low-voltage-side switching element 211, 213 and 215 each of the lower half-bridge branches is situated in series with the particular high-voltage-side switching element 205 through 209. Externally accessible terminals, which are, for example, conducted to the outside and are connectable to an electric motor 217, are situated between the particular series circuit made up of a particular high-voltage-side switching element 205 through 209 and a low-voltage-side switching element 211 through 215. The leads between the terminals and electric motor 217 may be characterized, for example, by inductors.

For example, decoupling switching elements 221, 223 and 225 connected in parallel to switching elements 211, 213 and 215 may also be implemented as power transistors, making it possible to implement the freewheeling diodes 227 simultaneously. If switching elements 205 through 215 are also designed as power transistor switches, one diode 219 is then situated in series with the particular switch. A freewheeling diode 220 is in each case connected in parallel to it.

A positive battery voltage may be applied to high-voltage-side switching elements 205 through 209 on the battery high-voltage side, while ground or a lower or negative voltage may be applied to low-voltage-side switching elements 211 through 215 on the battery low-voltage side.

As represented in FIG. 2, the use of decoupling switching elements 221 through 225 makes it possible in an advantageous manner for electric motor 217 to be separated from the input port, so that a recovery of energy into the intermediate circuit is no longer possible. Electric motor 217 also generates no torque on a shaft so that no torque load occurs. In addition, the use of decoupling switching elements 221 through 225 according to the present invention also makes it possible to use more economical electric motors, because they do not have to be sustained short-circuit-proof. Furthermore, the hardware circuit to be implemented for implementing the system represented in FIG. 2 is simple because no case differentiation is necessary in the case of different error states in a power section or in a control section. The only reaction in any case of error of electric motor 217 is the opening of all circuit breakers. Furthermore, the emergency supply of hardware for fusing during the active short-circuit may be eliminated, which makes a further reduction in hardware cost possible. Furthermore, a self-protection of the bridge inverter against a polarity-reversed intermediate circuit voltage is possible if switches 221 through 225 are not closed until the intermediate circuit voltage is present with correct polarity.

Figure 1:
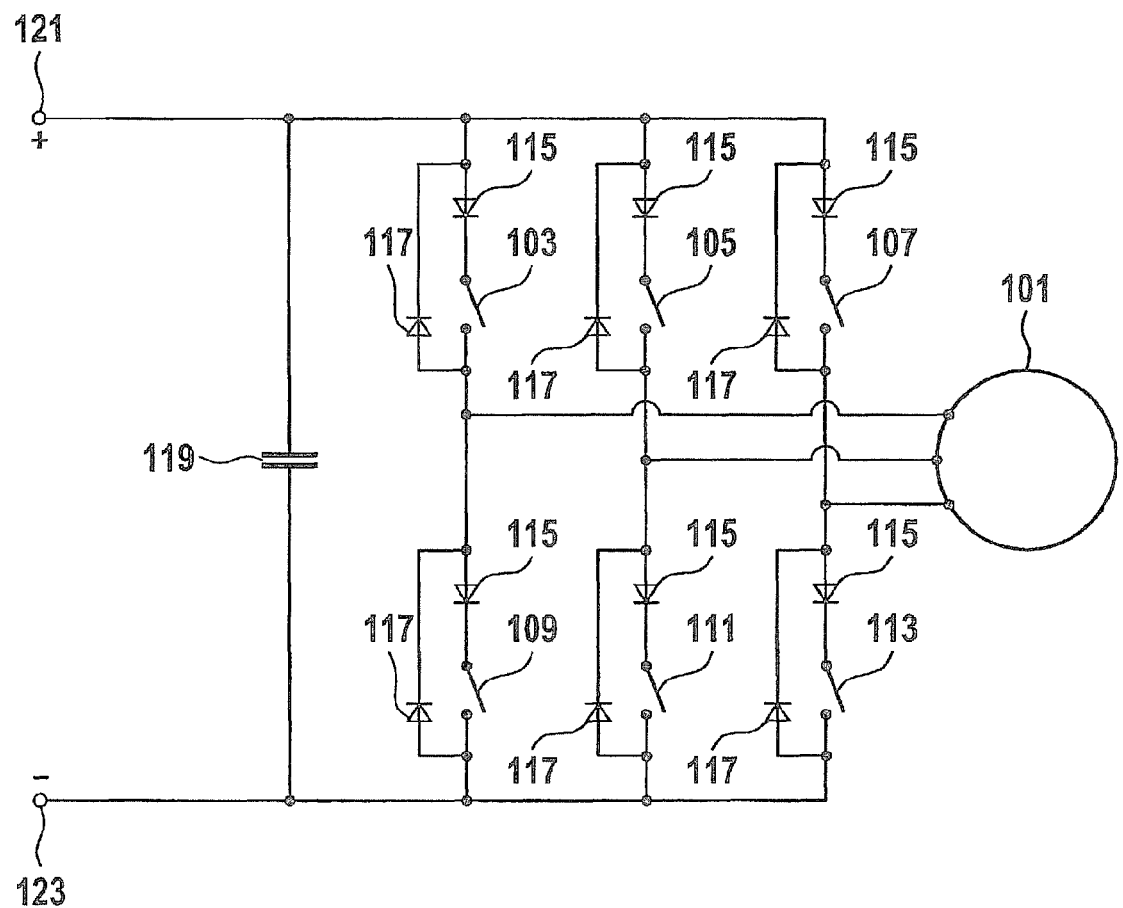
FIG. 1 shows a conventional inverter system.

As has been explained above, all freewheeling elements represented in FIG. 1 may be designed to be switchable, it being possible for the control of their switching functions to be performed by, for example, a synchronous rectification. The decoupling elements, which may be designed as circuit breakers, are closed when the current in the particular diametrically opposed switch of the same half-bridge branch is to be switched off, which occurs, for example, when switching off a high-voltage-side switch 205 through 209 causes the particular low-voltage-side switch 211 through 215 of the same half-bridge branch to be switched on. The power loss may be further reduced if the switchable decoupling elements, if designed as power transistor switches, have a lower forward voltage than correspondingly comparable current-carrying diodes.

Figure 3:
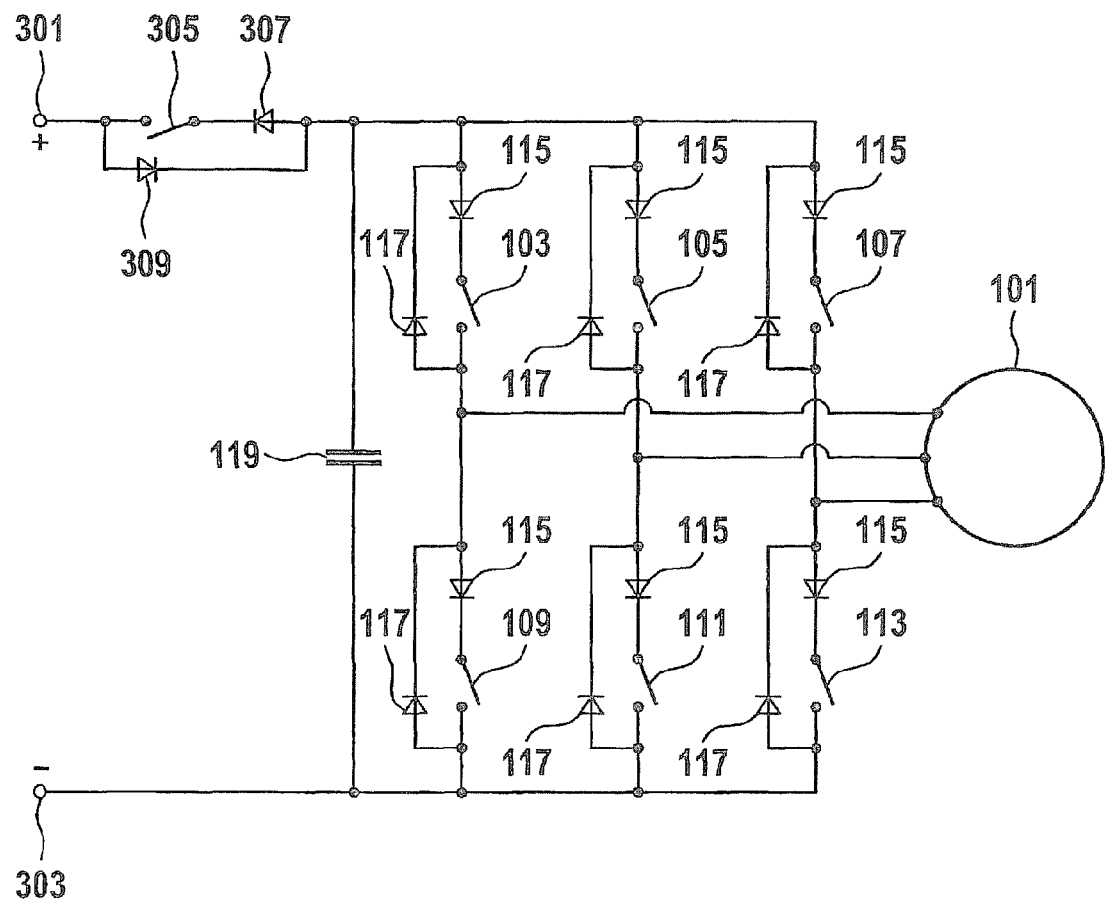
FIG. 3 shows another inverter system according to the present invention.

As an alternative or in addition to the principle represented in FIG. 2, it is also possible to provide an additional power module including a circuit breaker and a freewheeling diode or two anti-parallel circuit breakers at the intermediate circuit terminals of the bridge inverter circuit, for example, at its input port, as is elucidated, for example, in FIG. 3.

FIG. 3 shows an inverter system, in which in contrast to the inverter system represented in FIG. 1, for example, a decoupling element is situated between a terminal 301 of an input port of the inverter system, which has an additional terminal 303, and the bridge inverter circuit is connected downstream from the input port. The decoupling element includes a switching element 305, which may be designed as a circuit breaker. In this case, a diode 307 is situated in series with switching element 305. A diode 309 is connected anti-parallel to it. Diode 309 may be implemented, for example, as an additional power transistor. By opening switching element 305, in particular in case of error, the switching elements of the bridge inverter circuit and thus also electric motor 101 are decoupled from input port 301, 303. In this case, circuit breaker 305 in the intermediate circuit may be designed to be smaller than the other switches, since only the intermediate circuit current, which is lower compared to the phase currents, is able to flow in this case.

Intermediate circuit capacitor 119 may also be separated from the rest of the intermediate circuit if there is direct contacting to terminals 301 and 303, this advantageously eliminating a function for discharging the intermediate circuit in the bridge inverter circuit, since intermediate circuit capacitor 119 is no longer able to transfer energy into the intermediate circuit when switch 305 is open. If in case of error electric motor 101 generates a higher voltage than intermediate circuit capacitor 119 is able to tolerate, the latter may also be connected directly to positive terminal 301 upstream from the decoupling switching element including switch-off element 305. The same applies if the decoupling element including switching element 305 is installed between negative terminal 303 and the bridge inverter circuit in the low-voltage-side line.

The inverter system is not necessarily limited to the three-phase case represented by way of example in the figures. Instead, the number of bridge branches of the inverter system, which determines the total number of phases, may be arbitrary. The inverter system may, for example, have only two bridge branches, each having two series-connected switching elements, which are provided for supplying a simple electric motor with electrical energy. The inverter system may also include, for example, six or nine bridge branches, which are provided for supplying a corresponding multi-phase electric motor with electrical energy.

What is claimed is:

1. An inverter system for operating an electric motor, comprising:
    an input port for providing an electrical voltage;
    a bridge inverter circuit connected to the input port downstream from the input port for generating an electrical alternating voltage for the electric motor based on the electrical voltage, wherein the bridge inverter circuit has at least one half-bridge branch including switching elements configured to be selectively opened for transferring the electric motor into a freewheeling state; and
    decoupling switching elements configured to selectively decouple the at least one half-bridge branch in the freewheeling state of the electric motor from the input port, in order to suppress a reaction of the freewheeling electric motor on the input port.

2. The inverter system as recited in claim 1, wherein each decoupling switching element is connected in series to a freewheeling diode of the half-bridge branch.

3. The inverter system as recited in claim 1, wherein:
    the bridge inverter circuit has multiple high-voltage-side switching elements and a corresponding number of low-voltage-side switching elements; and
    each decoupling switching element is situated in parallel with at least one of (i) a corresponding high-voltage-side switching element and (ii) a corresponding low-voltage-side switching element.

4. The inverter system as recited in claim 1, wherein each decoupling switching element is implemented together with a diode as a power transistor.

5. The inverter system as recited in claim 1, wherein the decoupling switching elements are provided exclusively for the decoupling of the half-bridge branch in the case of a defective operation of the electric motor.

6. The inverter system as recited in claim 1, wherein one of the decoupling switching elements is situated between the input port and the bridge inverter circuit.

7. The inverter system as recited in claim 6, wherein the one of the decoupling switching elements situated between the input port and the bridge inverter circuit has a switch arm having a transistor switch and a diode connected in parallel with the switch arm.

8. The inverter system as recited in claim 7, wherein the diode is implemented by a power transistor.

9. An electric drive device, comprising:
    an electric motor; and
    an inverter system for operating the electric motor, wherein the inverter system includes:
        an input port for providing an electrical voltage;
        a bridge inverter circuit connected to the input port downstream from the input port for generating an electrical alternating voltage for the electric motor based on the electrical voltage, wherein the bridge inverter circuit has at least one half-bridge branch including switching elements configured to be selectively opened for transferring the electric motor into a freewheeling state; and
        decoupling switching elements configured to selectively decouple the at least one half-bridge branch in the freewheeling state of the electric motor from the input port, in order to suppress a reaction of the freewheeling electric motor on the input port.

10. A method for operating an electric motor, comprising:
    providing an inverter system for operating the electric motor, wherein the inverter system includes: an input port for providing an electrical voltage; a bridge inverter circuit connected to the input port downstream from the input port for generating an electrical alternating voltage for the electric motor based on the electrical voltage, wherein the bridge inverter circuit has at least one half-bridge branch including switching elements; and decoupling switching elements configured to selectively decouple the at least one half-bridge branch from the input port;
    selectively opening the switching elements of the at least one half-bridge branch for transferring the electric motor into a freewheeling state; and
    decoupling the at least one half-bridge branch from the input port by the decoupling switching elements in the freewheeling state of the electric motor to suppress a reaction of the freewheeling electric motor on the input port.

* * * * *